(12) United States Patent
Sun et al.

(10) Patent No.: US 10,311,183 B2
(45) Date of Patent: Jun. 4, 2019

(54) ANALYSIS OF A REPAIRED COMPOSITE STRUCTURE

(71) Applicant: THE BOEING COMPANY, Chicago, IL (US)

(72) Inventors: Zuo Sun, Bellevue, WA (US); William T. Williams, Seattle, WA (US); Agung Soehedi, Kent, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 15/476,420

(22) Filed: Mar. 31, 2017

(65) Prior Publication Data

US 2018/0285501 A1    Oct. 4, 2018

(51) Int. Cl.
*B29L 31/30* (2006.01)
*G05B 11/01* (2006.01)
*G06F 17/50* (2006.01)
*B29C 70/30* (2006.01)
*B29C 70/38* (2006.01)

(52) U.S. Cl.
CPC .......... *G06F 17/5018* (2013.01); *B29C 70/38* (2013.01); *G05B 11/011* (2013.01); *G06F 17/50* (2013.01); *B29L 2031/3076* (2013.01)

(58) Field of Classification Search
USPC .................... 703/2, 5; 382/100; 700/98, 106
See application file for complete search history.

(56) References Cited

U.S. PATENT DOCUMENTS

| | | | | |
|---|---|---|---|---|
| 9,394,853 B2* | 7/2016 | Shipley | | B29C 70/68 |
| 9,770,837 B2* | 9/2017 | Heine | | A45F 5/021 |
| 9,770,873 B2* | 9/2017 | Gilbert | | B29C 70/38 |
| 10,140,388 B1* | 11/2018 | Rassaian | | G06F 17/50 |
| 2012/0033851 A1* | 2/2012 | Chen | | G06T 7/0002 |
| | | | | 382/100 |
| 2012/0053716 A1* | 3/2012 | Bickel | | G06F 17/50 |
| | | | | 700/98 |
| 2014/0046469 A1* | 2/2014 | Bickel | | G06F 17/50 |
| | | | | 700/106 |
| 2014/0130480 A1* | 5/2014 | Shipley | | B29C 70/68 |
| | | | | 60/253 |
| 2016/0052214 A1* | 2/2016 | Gilbert | | B29C 70/38 |
| | | | | 700/33 |
| 2017/0186514 A1* | 6/2017 | Chopra | | C08J 3/12 |

* cited by examiner

*Primary Examiner* — Thai Q Phan
(74) *Attorney, Agent, or Firm* — Womble Bond Dickinson (US) LLP

(57) ABSTRACT

A method is provided for analyzing a repaired composite structure composed of a plurality of original plies and additional repair plies at an area of repair. The method includes performing a finite element analysis of a finite element model of the repaired composite structure, the finite element analysis being performed to determine in-situ strains at midplanes of the plurality of original plies and the additional repair plies. The method includes determining in-situ strains at top and bottom surfaces of the plurality of original plies and the additional repair plies from the midplane in-situ strains. The method includes determining a margin of safety for the repaired composite structure from in-situ strain data selected from the midplane in-situ strains and surface in-situ strains. And the method includes outputting the margin of safety from which to, or an indication to, accept or reject the repaired composite structure based on the margin of safety.

21 Claims, 9 Drawing Sheets

| Strain Allowables-In-Plane | | | | |
|---|---|---|---|---|
| | | BL | Inner Face | Outer Facesheet |
| | Em1t | 0.006 | 0.0042 | -0.0048 |
| | Em1c | -0.006 | -0.0048 | -0.0054 |
| | Sm12 | 0.015 | 0.012 | 0.0135 |

| Strain Allowables-In-Plane+Bending | | | | |
|---|---|---|---|---|
| | | BL | Inner Face | Outer Facesheet |
| | Eb1t | 0.009 | 0.0063 | 0.0072 |
| | Eb1c | -0.009 | -0.0072 | -0.0081 |
| | Sb12 | 0.02 | 0.016 | 0.018 |

MARGIN OF SAFETY (MS) OUTPUT FILE - SUMMARY

500

512

| Element | ID | Mode | MS_BL | MS_Heat | MS_Heat | MS_Heat | MS_DVD U | MS_DVD C | MS_DVD F | MS_Autoc | MS_Autoc | MS_Auto |
|---|---|---|---|---|---|---|---|---|---|---|---|---|
| 300818 | 30143 | inner_inplane | 9.06 | 5.03 | 5.54 | 6.54 | 7.05 | 7.55 | 8.05 | 7.05 | 7.55 | 8.05 |
| 300908 | 30143 | outer_inplane | 0.23 | -0.26 | -0.20 | -0.08 | -0.02 | 0.04 | 0.11 | -0.02 | 0.04 | 0.11 |
| 300707 | 30144 | inner_inplane | 8.26 | 4.56 | 5.02 | 5.95 | 6.41 | 6.87 | 7.34 | 6.41 | 6.87 | 7.34 |
| 301209 | 30144 | inner_inplane | 5.30 | 2.78 | 3.09 | 3.72 | 4.04 | 4.35 | 4.67 | 4.04 | 4.35 | 4.67 |
| 301210 | 30144 | outer_inplane | 2.65 | 1.19 | 1.37 | 1.74 | 1.92 | 2.10 | 2.28 | 1.92 | 2.10 | 2.28 |
| 301216 | 30144 | inner_inplane | 8.26 | 4.56 | 5.02 | 5.95 | 6.41 | 6.87 | 7.34 | 6.41 | 6.87 | 7.34 |
| 301217 | 30144 | inner_inplane | 1.98 | 0.79 | 0.94 | 1.24 | 1.39 | 1.54 | 1.69 | 1.39 | 1.54 | 1.69 |
| 300104 | 30145 | inner_inplane | 0.59 | -0.05 | 0.03 | 0.19 | 0.27 | 0.35 | 0.43 | 0.27 | 0.35 | 0.43 |
| 300105 | 30145 | inner_inplane | 9.97 | 5.58 | 6.13 | 7.22 | 7.77 | 8.32 | 8.87 | 7.77 | 8.32 | 8.87 |
| 300106 | 30145 | inner_inplane | 8.41 | 4.65 | 5.12 | 6.06 | 6.53 | 7.00 | 7.47 | 6.53 | 7.00 | 7.47 |
| 300204 | 30145 | inner_inplane | 3.78 | 1.87 | 2.11 | 2.59 | 2.83 | 3.06 | 3.30 | 2.83 | 3.06 | 3.30 |
| 300205 | 30145 | inner_inplane | 0.60 | -0.04 | 0.04 | 0.20 | 0.28 | 0.36 | 0.44 | 0.28 | 0.36 | 0.44 |
| 300206 | 30145 | inner_inplane | 5.20 | 2.72 | 3.03 | 3.65 | 3.96 | 4.27 | 4.58 | 3.96 | 4.27 | 4.58 |
| 300219 | 30145 | inner_inplane | 1.45 | 0.47 | 0.59 | 0.84 | 0.96 | 1.08 | 1.20 | 0.95 | 1.08 | 1.20 |
| 300220 | 30145 | inner_inplane | 6.38 | 3.43 | 3.80 | 4.54 | 4.91 | 5.27 | 5.64 | 4.91 | 5.27 | 5.64 |
| 300221 | 30145 | inner_inplane | 9.27 | 5.16 | 5.67 | 6.70 | 7.21 | 7.73 | 8.24 | 7.21 | 7.73 | 8.24 |
| 300304 | 30145 | inner_inplane | 6.93 | 3.76 | 4.16 | 4.95 | 5.35 | 5.74 | 6.14 | 5.35 | 5.74 | 6.14 |
| 300305 | 30145 | inner_inplane | 3.40 | 1.64 | 1.86 | 2.30 | 2.52 | 2.74 | 2.96 | 2.52 | 2.74 | 2.96 |
| 300306 | 30145 | inner_inplane | 3.54 | 1.72 | 1.95 | 2.40 | 2.63 | 2.86 | 3.08 | 2.63 | 2.86 | 3.08 |
| 300319 | 30145 | inner_inplane | 7.15 | 3.89 | 4.30 | 5.11 | 5.52 | 5.93 | 6.33 | 5.52 | 5.93 | 6.33 |
| 300320 | 30145 | inner_inplane | 7.66 | 4.19 | 4.63 | 5.49 | 5.92 | 6.36 | 6.79 | 5.92 | 6.36 | 6.79 |
| 300321 | 30145 | inner_inplane | 7.17 | 3.90 | 4.31 | 5.12 | 5.53 | 5.94 | 6.35 | 5.53 | 5.94 | 6.35 |
| 300404 | 30145 | inner_inplane | 0.13 | -0.32 | -0.27 | -0.15 | -0.10 | -0.04 | 0.02 | -0.10 | -0.04 | 0.02 |
| 300405 | 30145 | inner_inplane | 9.20 | 5.12 | 5.63 | 6.65 | 7.16 | 7.67 | 8.18 | 7.16 | 7.67 | 8.18 |
| 300406 | 30145 | inner_inplane | 9.20 | 5.12 | 5.63 | 6.65 | 7.16 | 7.67 | 8.18 | 7.16 | 7.67 | 8.18 |
| 300419 | 30145 | inner_inplane | 6.00 | 3.20 | 3.55 | 4.25 | 4.60 | 4.95 | 5.30 | 4.60 | 4.95 | 5.30 |
| 300420 | 30145 | inner_inplane | 3.86 | 1.92 | 2.16 | 2.65 | 2.89 | 3.13 | 3.38 | 2.89 | 3.13 | 3.38 |
| 300421 | 30145 | inner_inplane | 4.99 | 2.59 | 2.89 | 3.49 | 3.79 | 4.09 | 4.39 | 3.79 | 4.09 | 4.39 |
| 300719 | 30145 | inner_inplane | 8.29 | 4.57 | 5.04 | 5.97 | 6.43 | 6.89 | 7.36 | 6.43 | 6.89 | 7.36 |
| 300720 | 30145 | outer_inplane | 5.20 | 2.72 | 3.03 | 3.65 | 3.96 | 4.27 | 4.58 | 3.96 | 4.27 | 4.58 |
| 300721 | 30145 | outer_inplane | 8.03 | 4.42 | 4.87 | 5.78 | 6.23 | 6.68 | 7.13 | 6.23 | 6.68 | 7.13 |
| 301019 | 30146 | inner_inplane | 0.72 | 0.03 | 0.12 | 0.29 | 0.38 | 0.46 | 0.55 | 0.38 | 0.46 | 0.55 |
| 301020 | 30146 | outer_inplane | 1.37 | 0.42 | 0.54 | 0.78 | 0.89 | 1.01 | 1.13 | 0.89 | 1.01 | 1.13 |

FIG. 5

MARGIN OF SAFETY (MS) OUTPUT FILE—
DETAILED ELEMENT MS
600

Strain Allowables — 602

In-Plane

| | RT | K1 | K2 |
|---|---|---|---|
| Ent | 6000 | 0.7 | 0.8 |
| Enc | -6000 | 0.8 | 0.9 |
| Sn_12 | 15000 | 0.8 | 0.9 |

In-Plane+bending — 608

| | RT | K1 | K2 |
|---|---|---|---|
| Et | 9000 | 0.7 | 0.8 |
| Ec | -9000 | 0.8 | 0.9 |
| S12 | 20000 | 0.8 | 0.9 |

MS In-Plane — 604, 606

| Inner Face | MS | Outer Faceshe | MS |
|---|---|---|---|
| 0 | 0.8 | 0 | 2.93 |
| 90 | 0.13 | 90 | 0.32 |
| 45 | 3.89 | 45 | 2.93 |
| -45 | 1.1 | -45 | 0.34 |

MS In-Plane+bending — 610, 612, 614, 616

| Ply | Surf | e-1 | e-2 | e-12 | MS_1 | MS_2 | MS_12 |
|---|---|---|---|---|---|---|---|
| 1 | Bot | 5.24708E-05 | -0.00146 | -0.00204 | 119.07 | 3.92 | 6.83 |
| 1 | Top | 6.27403E-05 | -0.00146 | -0.00205 | 99.41 | 3.92 | 6.81 |
| 2 | Bot | 0.000324667 | -0.00172 | 0.001526 | 18.40 | 3.17 | 9.49 |
| 2 | Top | 0.000333078 | -0.00172 | 0.001536 | 17.91 | 3.18 | 9.42 |
| 3 | Bot | 7.30098E-05 | -0.00146 | -0.00206 | 85.29 | 3.92 | 6.78 |
| 3 | Top | 8.32793E-05 | -0.00146 | -0.00206 | 74.65 | 3.92 | 6.76 |
| 4 | Bot | 0.000341489 | -0.00172 | 0.001547 | 17.45 | 3.18 | 9.34 |
| 4 | Top | 0.0003499 | -0.00172 | 0.001557 | 17.01 | 3.19 | 9.27 |
| 5 | Bot | 9.35488E-05 | -0.00146 | 0.00207 | 66.34 | 3.92 | 6.73 |
| 5 | Top | 0.000103818 | -0.00146 | 0.00208 | 59.68 | 3.92 | 6.70 |
| 6 | Bot | 0.000358311 | -0.00172 | 0.001568 | 16.58 | 3.19 | 9.20 |
| 6 | Top | 0.000366722 | -0.00172 | 0.001579 | 16.18 | 3.19 | 9.14 |
| 7 | Bot | 0.000366722 | -0.00172 | 0.001579 | 16.18 | 3.19 | 9.14 |
| 7 | Top | 0.000375134 | -0.00172 | 0.001589 | 15.79 | 3.20 | 9.27 |
| 8 | Bot | 0.000124358 | -0.00146 | -0.00209 | 49.66 | 3.92 | 6.65 |
| 8 | Top | 0.000134627 | -0.00147 | -0.0021 | 45.80 | 3.91 | 6.63 |
| 9 | Bot | 0.000383545 | -0.00171 | 0.0016 | 15.43 | 3.20 | 9.00 |
| 9 | Top | 0.000391955 | -0.00171 | 0.00161 | 15.07 | 3.20 | 8.94 |
| 10 | Bot | 0.000144897 | -0.00147 | -0.0021 | 48.69 | 4.53 | 7.55 |
| 10 | Top | 0.000155166 | -0.00147 | -0.0021 | 45.40 | 4.53 | 7.53 |
| 11 | Bot | 0.000400365 | -0.00171 | 0.001621 | 16.98 | 3.73 | 10.10 |
| 11 | Top | 0.000408775 | -0.00171 | 0.001632 | 16.61 | 3.74 | 10.03 |
| 12 | Bot | 0.000165435 | -0.00147 | -0.00212 | 42.52 | 4.52 | 7.50 |
| 12 | Top | 0.000175704 | -0.00147 | -0.00213 | 39.98 | 4.52 | 7.47 |
| 13 | Bot | 0.000417186 | -0.00171 | 0.001642 | 16.26 | 3.74 | 9.96 |
| 13 | Top | 0.001390016 | -0.00153 | 0.002869 | 4.18 | 4.29 | 5.27 |
| 14 | Bot | 0.0013635 | -0.00151 | -0.00292 | 4.28 | 4.38 | 5.16 |
| 14 | Top | 0.001373769 | -0.00151 | -0.00293 | 4.24 | 4.38 | 5.15 |
| 15 | Bot | 0.001398427 | -0.00153 | -0.002879 | 4.15 | 4.29 | 5.25 |
| 15 | Top | 0.001406837 | -0.00153 | 0.00289 | 4.12 | 4.30 | 5.23 |
| 16 | Bot | 0.001406837 | -0.00153 | 0.00289 | 4.12 | 4.30 | 5.23 |
| 16 | Top | 0.001415247 | -0.00153 | 0.002901 | 4.09 | 4.30 | 5.21 |
| 17 | Bot | 0.001394305 | -0.00151 | -0.00294 | 4.16 | 4.38 | 5.12 |
| 17 | Top | 0.001404572 | -0.00151 | -0.00295 | 4.13 | 4.38 | 5.10 |

FIG. 6

ANALYSIS OF A REPAIRED COMPOSITE STRUCTURE

TECHNOLOGICAL FIELD

The present disclosure relates generally to analysis of a repaired composite structure and, in particular, to the margin of safety for the repaired composite structure.

BACKGROUND

Recent demands in the aerospace industry towards substantially improving fuel economy and extending flight range have driven accelerated use of advanced composites as primary structural materials. The next-generation airplanes will have substantial parts made of light-weight composites. This means that the engineering demands on the safety of fiber-reinforced composites will become greater. Therefore there is a need for better structural and failure analysis of composite structures.

Structural margin of safety analysis is one type of analysis for structural analysis engineers to certify the soundness of composite structures. The margin of safety analysis of composite structures includes development of specific process and analysis tools to account for the increased complexity of the failure modes of composite structures relative to traditional metallic structures.

In current existing techniques for structural analysis of repaired composite structures, composite element loads in conjunction with very conservative factors are used to analyze the margins of safety of composite structures. The current techniques assume that the composite element loads after repair are unchanged and a conservative load factor is used to cover the element load increase due to extra plies added in the repair.

Accordingly, it would be desirable to have a system and method that takes into account at least some of the issues discussed above, as well as other possible issues.

BRIEF SUMMARY

Example implementations of the present disclosure are generally directed to a system, and corresponding method and computer-readable storage medium for analysis of repaired composite structures using in-situ strains to analyze their margins of safety. As mentioned above, in current existing techniques, composite element loads are used with very conservative factors. Therefore, the present disclosure provides more accurate analysis of repaired composite structures.

Analysis of repaired composite structures provided by the present disclosure determines element strains at top and bottom layers of each ply by, in some implementations, linear interpolation or extrapolation of the strains in the middle layers of composite structures. In current existing techniques, the element strains at top and bottom layers of each ply are calculated from the multiplication of composite element loads and element stiffness matrix, which is a more complex process.

Analysis of repaired composite structures provided by the present disclosure also eliminates several intermediate steps in deriving margins of safety of repaired composite structures. The eliminated steps include transferring element loads into material system, and calculating a stiffness matrix of composite elements.

The present disclosure thus includes, without limitation, the following example implementations.

Some example implementations provide a method for analyzing a repaired composite structure composed of a plurality of original plies and additional repair plies at an area of repair, each ply including a top surface, a midplane and a bottom surface, the method comprising performing a finite element analysis of a finite element model of the repaired composite structure composed of a plurality of finite elements for the plurality of original plies and the additional repair plies, the finite element analysis being performed to determine in-situ strains at the midplanes of and thereby midplane in-situ strains at the plurality of original plies and the additional repair plies; determining in-situ strains at the top surface and the bottom surface of and thereby surface in-situ strains at the plurality of original plies and the additional repair plies from the midplane in-situ strains; determining a margin of safety for the repaired composite structure from in-situ strain data selected from the midplane in-situ strains and surface in-situ strains; and outputting the margin of safety from which to accept or reject the repaired composite structure, or an indication to accept or reject the repaired composite structure based on the margin of safety.

In some example implementations of the method of any preceding or any subsequent example implementation, or any combination thereof, determining the surface in-situ strains includes interpolating or extrapolating the surface in-situ strains from the midplane in-situ strains.

In some example implementations of the method of any preceding or any subsequent example implementation, or any combination thereof, determining the margin of safety includes determining an in-plane margin of safety based on a ratio of an allowable in-plane strain and an average of the midplane in-situ strains, and a bending margin of safety based on a ratio of an allowable bending strain and a maximum of the surface in-situ strains.

In some example implementations of the method of any preceding or any subsequent example implementation, or any combination thereof, determining the margin of safety includes determining a minimum of the in-plane margin of safety and the bending margin of safety and thereby the margin of safety for the repaired composite structure.

In some example implementations of the method of any preceding or any subsequent example implementation, or any combination thereof, the repaired composite structure is a repaired composite sandwich structure composed of two fiber-reinforced composite face sheets and a core, each of the two fiber-reinforced composite face sheets including a plurality of original plies, one of the two fiber-reinforced composite face sheets including the additional repair plies, and wherein determining the margin of safety includes determining an in-plane margin of safety for each fiber-reinforced composite face sheet based on a ratio of an allowable in-plane strain and an average of the midplane in-situ strains in plies of the fiber-reinforced composite face sheet, including the original plies and the additional repair plies in the one of the two fiber-reinforced composite face sheets that includes the additional repair plies.

In some example implementations of the method of any preceding or any subsequent example implementation, or any combination thereof, determining the in-plane margin of safety includes determining in-plane margins of safety for combined loads and moments applied parallel, tangential and perpendicular to fibers in the two fiber-reinforced composite face sheets.

In some example implementations of the method of any preceding or any subsequent example implementation, or any combination thereof, the repaired composite structure is a repaired composite sandwich structure composed of two fiber-reinforced composite face sheets and a core, and wherein determining the margin of safety includes determining a bending margin of safety based on a ratio of an allowable bending strain and a maximum of the surface in-situ strains.

Some example implementations provide an apparatus for implementation of a system for analyzing a repaired composite structure. The apparatus comprises a processor and a memory storing executable instructions that, in response to execution by the processor, cause the apparatus to at least perform the method of any preceding example implementation, or any combination thereof. This may include implementation of a repaired composite analysis system including a finite element analysis (FEA) subsystem and a margin of safety analysis subsystem coupled to one another and configured to perform steps of the method.

Some example implementations provide a computer readable medium for analyzing a repaired composite structure. The computer-readable storage medium is non-transitory and having computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 5, 6 and 7 are example outputs of the margin of safety analysis subsystem, according to example implementations.

DETAILED DESCRIPTION

Figure 1:
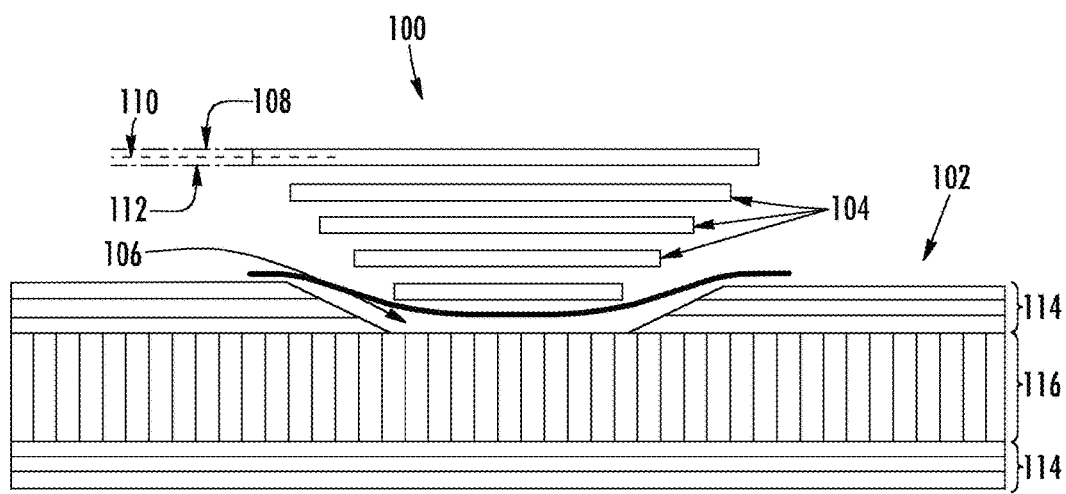
FIG. 1 illustrates a repaired composite structure in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are directed to a system, and corresponding method and computer-readable storage medium for analysis of repaired composite structures using in-situ strains to analyze their margins of safety. Analysis of repaired composite structures provided by the present disclosure eliminates several intermediate steps in deriving margins of safety of repaired composite structures. The eliminated steps include transferring element loads into material system, and calculating a stiffness matrix of composite elements.

FIG. 1 illustrates a repaired composite structure 100 according to some example implementations of the present application. As shown, the repaired composite structure 100 is generally composed of a plurality of original plies 102 and additional repair plies 104 at an area of repair 106. As also shown, each ply includes a top surface 108, a midplane 110 and a bottom surface 112. In some more particular examples, the repaired composite structure 100 is a repaired composite sandwich structure composed of two fiber-reinforced composite face sheets 114 and a core 116. Each of the two fiber-reinforced composite face sheets includes a plurality of original plies 102, and one of the two fiber-reinforced composite face sheets includes the additional repair plies 104. In other examples, the other or both of the two fiber-reinforced composite face sheets includes the additional repair plies.

Figure 2:
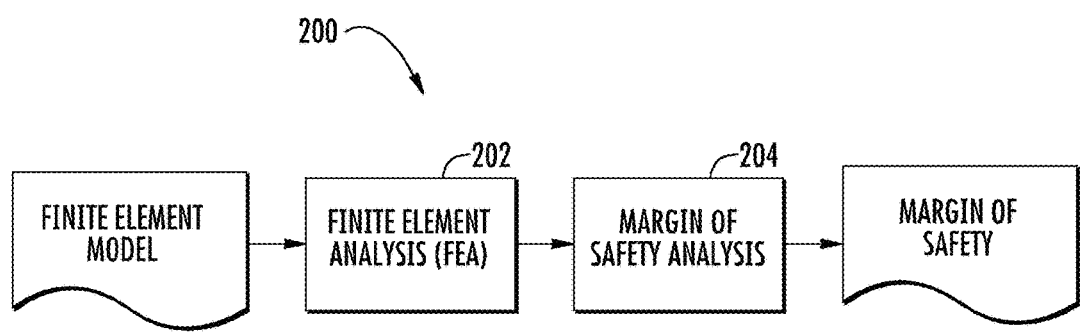
FIG. 2 illustrates a system for analyzing a repaired composite structure in accordance with example implementations of the present disclosure.

FIG. 2 illustrates a system 200 for analyzing a repaired composite structure 100 described below with reference to repaired composite structure 100, according to example implementations of the present disclosure. The system, at times referred to as a repaired composite analysis system, is configured to perform a number of different functions or operations, either automatically, under direct operator control, or some combination of thereof. In this regard, in some examples, the system is configured to perform one or more of its functions or operations automatically, that is, without being directly controlled by an operator. Additionally or alternatively, in some examples, the system is configured to perform one or more of its functions or operations under direct operator control.

The repaired composite analysis system 200 may include one or more of each of any of a number of different subsystems (each an individual system) for performing one or more of its functions or operations. As shown, for example, the system may include a finite element analysis (FEA) subsystem 202 and margin of safety analysis subsystem 204 coupled to one another. Although being shown together as part of the system, it should be understood that either of the subsystems may function or operate as a separate system without regard to the other. And further, it should be understood that the system may include one or more additional or alternative subsystems than those shown in FIG. 2.

The FEA subsystem 202 is generally configured to perform a finite element analysis of a finite element model of the repaired composite structure 100. The finite element model is composed of a plurality of finite elements for the plurality of original plies 102 and the additional repair plies 104. The FEA subsystem 202 is generally configured to determine in-situ strains at the midplanes of and thereby midplane in-situ strains at the plurality of original plies and the additional repair plies. The FEA subsystem 202 is also generally configured to match the midplane in-situ strain with each finite element for the plurality of original plies 102 and the additional repair plies 104.

The margin of safety analysis subsystem 204 is generally configured to determine in-situ strains at the top surface and the bottom surface of and thereby surface in-situ strains at the plurality of original plies 102 and the additional repair plies 104 from the midplane in-situ strains. In some examples, this includes the margin of safety analysis subsystem being configured to interpolate or extrapolate the surface in-situ strains from the midplane in-situ strains. The margin of safety analysis subsystem 204 is also generally configured to determine a margin of safety for the repaired composite structure 100 from in-situ strain data selected from the midplane in-situ strains and surface in-situ strains. And the margin of safety analysis subsystem is configured to output the margin of safety from which to accept or reject the repaired composite structure, or an indication to accept or reject the repaired composite structure based on the margin of safety.

As mentioned herein before, the FEA subsystem 202 is generally configured to perform a finite element analysis of a finite element model of the repaired composite structure 100. In some examples, the FEA subsystem develops and analyzes one or more appropriate finite element models of the repaired composite structure 100. The FEA subsystem may be configured to receive or generate a finite element model of a composite structure. The finite element model may represent the composite structure by a mesh of finite elements, and it will be readily understood by a person of ordinary skill in the art that the composite structure may be represented by two or three dimensional element, such as a shell element for example. The elements may be or include one or more disjointed (non-overlapping) components of a model in which each element may possess a set of distinguishing points called nodal points or nodes.

Each element may be embodied in terms of a finite number of degrees of freedom characterized as a value of an unknown function, or function, at a set of nodal points. An element may further comprise degrees of freedom (DOF) that function as a point at which two elements may be connected and specify the state of the element. The degrees of freedom may be defined as the values and/or derivatives of a state variable at connected nodal points in which a state variable may refer to a variable utilized to describe a mathematical state of a model. In some example implementations, the nodal points may be located at the corners and/or end points of the elements such that the geometry of an element may be defined by the placement of geometric sets of nodal points.

The nodal dataset for each set of nodal points may include values of a property or state of the composite structure at respective nodal points of the set of nodal points. Examples of suitable properties include geometric or inertial properties and constitutive properties such as residual thickness, principal curvature, elastic modulus, thermal coefficient of expansion and the like. The constitutive properties may specify the material behavior of the structure at respective nodal points. Examples of suitable states include state variables such as components of the derived stress and strain tensors, and temperature at the respective nodal points. This method may also be applicable to element-based datasets such as element forces, properties, and the like.

The analysis of the repaired composite structure 100 may be or include analysis via one or more algorithms and/or measurement-based analysis. For example, the FEA subsystem 202 may be configured to derive and solve governing matrix equations from the finite element model. The FEA subsystem may also be configured to check the validity of the solutions (e.g., displacements, stresses, specialized stresses, error indicators); and in some examples, the FEA subsystem may perform at least one other appropriate analysis on the finite element model and/or solutions. As mentioned herein before, the FEA subsystem is configured to perform an analysis of the finite element model of the repaired composite structure to determine in-situ strains at the midplanes of and thereby midplane in-situ strains at the plurality of original plies 102 and the additional repair plies 104.

In some examples, the FEA subsystem 202 benefits from commercially-available software tools. Examples of suitable tools include Abaqus, available from Dassault Systèmes S. A.; the ANSYS software suite (Fluent); NASTRAN/PATRAN, available from MSC Software Corporation; SolidWorks (COSMOSworks), COMSOL Multiphysics® (FEALAB), available from COMSOL Inc. of Burlington, Mass.; GENESIS; Altair HyperView, available from Altair Engineering, Inc.; NX (Unigraphics), available from Siemens PLM Software of Plano, Tex.; TAK 2000, available from K&K Associates of Westminster, Colo.; Pro/ENGINEER, available from PTC Inc. of Needham, Mass.; LS-DYNA®, available from Livermore Software Technology Corporation (LSTC) of Livermore, Calif.; and the like.

Figure 3:
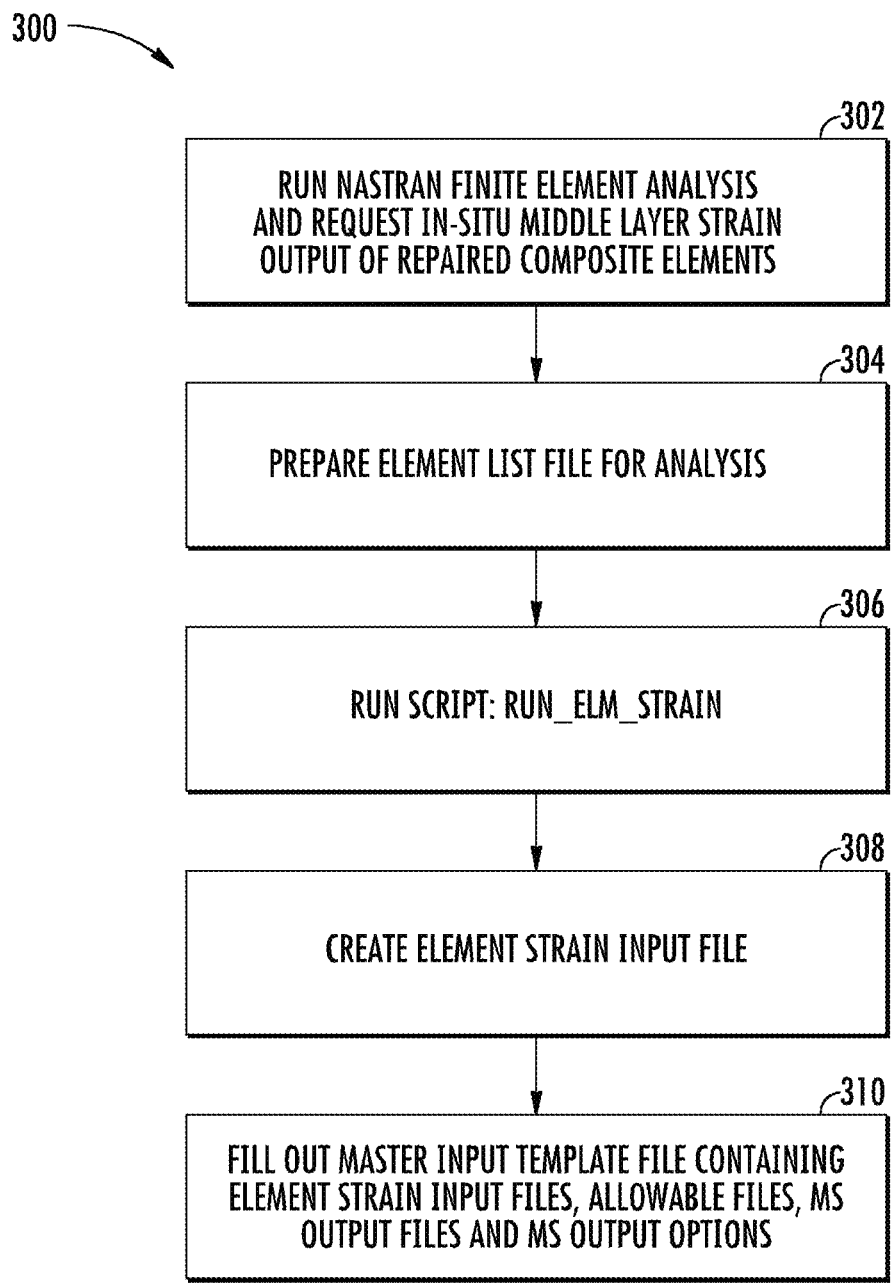
FIG. 3 is a process flow diagram of a process that may be implemented by a finite element analysis (FEA) subsystem of the system of FIG. 2, according to example implementations.
Figure 4:
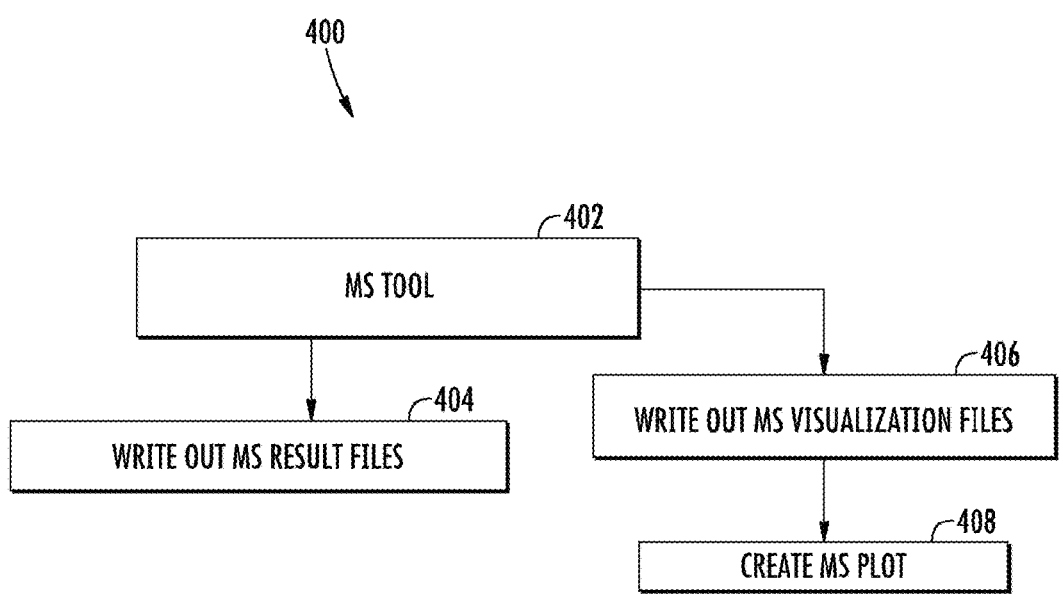
FIG. 4 is a process flow diagram of a process that may be implemented by a margin of safety analysis subsystem of the system of FIG. 2, according to example implementations.

To further illustrate example implementations of the present disclosure, reference is now made to FIGS. 3 and 4, which are process flow diagrams 300 and 400 of processes that may be implemented by respectively the FEA subsystem 202 and margin of safety analysis subsystem 204, according to example implementations of the present disclosure.

FIG. 3 is a process flow diagram 300 for the FEA subsystem 202, according to some example implementations. As stated previously herein, the FEA subsystem is configured to perform an analysis of the finite element model of the repaired composite structure 100 to determine in-situ strains at the midplanes of and thereby midplane in-situ strains at the plurality of original plies 102 and the additional repair plies 104. As shown in block 302, the process includes running a NASTRAN or other suitable finite element analysis of the finite element model of the repaired composite structure to determine midplane in-situ strains at the plurality of original plies and the additional repair plies. And as shown in block 304, the process includes generating an element list file including a list of the finite elements for the plurality of original plies and the additional repair plies. In some examples, the element list file is input to script or other suitable computer program process block 306. As mentioned previously herein, the FEA subsystem is generally configured to match the midplane in-situ strain with each finite element for the plurality of original plies 102 and the additional repair plies 104. As shown in block 306, the process includes running the script or other suitable computer program that is generally configured to match the midplane in-situ strain with each finite element included in the element list file of the finite elements for the plurality of original plies and the additional repair plies. The process further includes generating an element strain input file including the midplane in-situ strains for each finite element, as shown in block 308. The element strain input file may be utilized to generate a master input template file, discussed further below, as shown in block 310. The master input template file is configured to include midplane strain files, allowable files, margin of safety output files and margin of safety output options. The master input template file may be input to the margin of safety analysis subsystem 204.

The script run in the process block 306 is generally configured to match the midplane in-situ strain with each finite element for the plurality of original plies 102 and the additional repair plies 104. In some examples, the element list file, mentioned previously herein, may be received as input by the script. The script is generally configured to generate the element strain input file referred to herein above. The element strain input file may include the midplane in-situ strains at the plurality of original plies and the additional repair plies. The element strain input file is generally included in the master input template file.

FIG. 4 is a process flow diagram 400 for the margin of safety analysis subsystem 204, according to example implementations. The margin of safety analysis subsystem is generally configured to determine the surface in-situ strains by interpolation or extrapolation from the midplane in-situ strains. The margin of safety analysis subsystem is also generally configured to determine a margin of safety for the repaired composite structure 100 from in-situ strain data selected from the midplane in-situ strains and surface in-situ strains. Block 402 illustrates a margin of safety tool included within or implemented by the margin of safety analysis subsystem 204. Generally the margin of safety tool is configured to receive as input the master input template file. The master input template file includes, at least, midplane in-situ strains, and allowable files. The allowable files contain allowable in-plane strain and allowable bending strain. The margin of safety tool 402 of the margin of safety analysis subsystem 204 is configured to determine the surface in-situ strains by interpolation or extrapolation from the midplane in-situ strains contained in the master input template file. Utilizing the master input template file, the margin of safety tool 402 of the margin of safety analysis subsystem 204 is also configured to determine an in-plane margin of safety based on a ratio of an allowable in-plane strain and an average of the midplane in-situ strains, and a bending margin of safety based on a ratio of an allowable bending strain and a maximum of the surface in-situ strains.

More specifically, in some examples, the margin of safety=allowables/maximum (strain)-1. Therefore, in-plane margin of safety=in-plane allowable/maximum(in-plane strain)-1 and bending margin of safety=bending allowable/maximum(bending strain)-1. In some examples, the margin of safety analysis subsystem is configured to determine a minimum of the in-plane margin of safety and the bending margin of safety and thereby the margin of safety for the repaired composite structure.

In some examples in which the repaired composite structure 100 is a repaired composite sandwich structure as illustrated in FIG. 1, the margin of safety analysis subsystem 204 being configured to determine the margin of safety includes being configured to determine an in-plane margin of safety for each fiber-reinforced composite face sheet. In these examples, the in-plane margin of safety is determined based on a ratio of an allowable in-plane strain and an average of the midplane in-situ strains in plies of the fiber-reinforced composite face sheet, including the original plies 102 and the additional repair plies 104 in the one of the two fiber-reinforced composite face sheets that includes the additional repair plies. In some further examples, the margin of safety analysis subsystem is configured to determine in-plane margins of safety for combined loads and moments applied parallel, tangential and perpendicular to fibers in the two fiber-reinforced composite face sheets.

In some examples in which the repaired composite structure 100 is a repaired composite sandwich structure, the margin of safety analysis subsystem being configured to determine the margin of safety includes being configured to determine a bending margin of safety. In these examples, the bending margin of safety is determined based on a ratio of an allowable bending strain and a maximum of the surface in-situ strains.

In some examples, the master input template file includes the element strain input file, the allowable files, the margin of safety output files, an option for output, and a margin of safety visualization file. The option for output may include an indicator representing the type of margin of safety file that is generated. The indicator may include a 0 to output both detailed margin of safety for all elements and a margin of safety summary and a 1 to output only the margin of safety summary.

The process flow diagram of FIG. 4 also includes a write out margin of safety result files 404, a write out margin of safety visualization files 406 and creation of a margin of safety plot. According to example implementations, the margin of safety result files 404 may include output files generated according to the indicator in the master input template file. The margin of safety visualization files 406 may include a margin of safety visualization file further discussed herein below. As mentioned previously herein, the margin of safety analysis subsystem 204 is configured to output the margin of safety from which to accept or reject the repaired composite structure 100, or an indication to accept or reject the repaired composite structure based on the margin of safety. An instance in which the margin of safety is positive may provide an indication to accept the repaired composite structure based on the margin of safety. An instance in which the margin of safety is negative may provide an indication to reject the repaired composite structure 100 based on the margin of safety.

Figure 7:
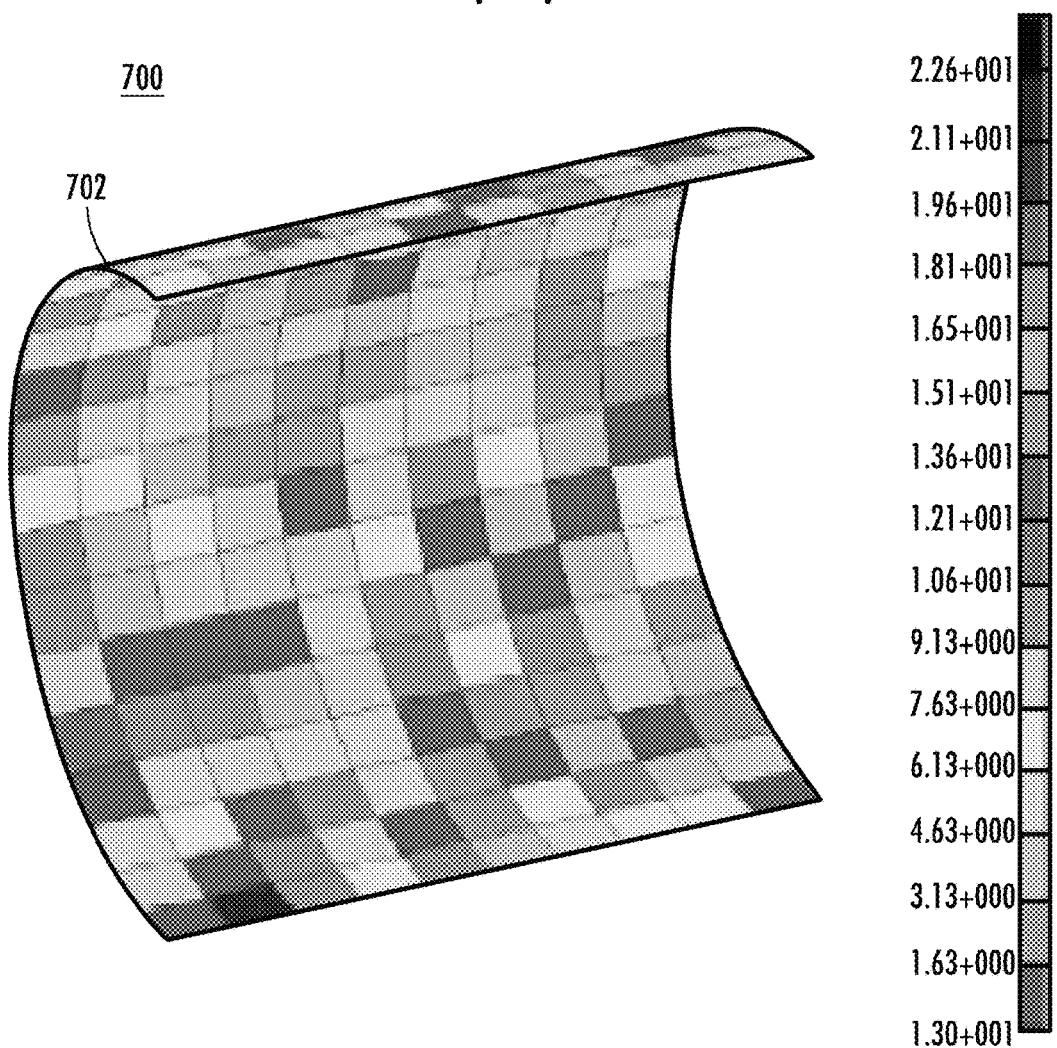

FIGS. 5, 6 and 7 are example outputs of the margin of safety analysis subsystem, according to example implementations.

FIG. 5 is an exemplary illustration of a summary margin of safety output file 500 generated in accordance with an example implementation. As illustrated, the summary output file 500 includes the allowable in-plane strain 502 and the allowable bending strain 504 from the master input template file referred to herein above. The summary output file may also include properties of the plurality of finite elements for the plurality of original plies 102 and the additional repair plies 104. For example, a finite element identification (ID) 506, finite element property id 508 including the number of plies, materials, ply orientations and ply thickness and a finite element failure mode 510 may generally be included in the summary output file. Additionally, the summary output file may include a finite element detailed margin of safety 512 which may be based on a type of process used to repair the repaired composite structure 100. In the allowable in-plane strain 502, Em1t indicates allowable in-plane strain in tension of composite element, Em1c indicates allowable in-plane strain in compression of composite element, Sm12 indicates allowable in-plane strain in shear of composite element, Eb1c and BL Eb1t indicates base line values (e.g., room temperature values). In the allowable bending strain 504, allowable bending strain in compression of composite element, and Sb12 indicates allowable bending strain in shear of composite element.

FIG. 6 is an exemplary illustration of a detailed element margin of safety output file 600 in accordance with an example implementation where the repaired composite structure 100 is a repaired composite sandwich structure. The detailed output file 600 may further illustrate the allowable in-plane strain 602 and the allowable bending strain 608 at room temperature and temperature knockdowns at analyzed load conditions. Additionally, the output file may include the in-plane margin of safety 604 at the inner face sheet 114 and in-plane margin of safety 606 at the outer face sheet 114. The output file may also include a sandwich panel ply id 610, ply surfaces 612, element strain values 614 and the bending margin of safety 616 along fiber, transverse and shear directions. In the allowable in-plane strain 602 and the allowable bending strain 608, RT indicates room temperature, K1 indicates temperature reduction factors for composite inner face sheet, and K2 indicates temperature reduction factors for composite outer face sheet.

FIG. 7 is a plot 702 that may be included in the margin of safety visualization file of the margin of safety visualization files. As shown, the plot of the margin of safety is generated from MS visualization file 406 illustrating the margins of safety values on the repaired composite structure 100.

Figure 8:
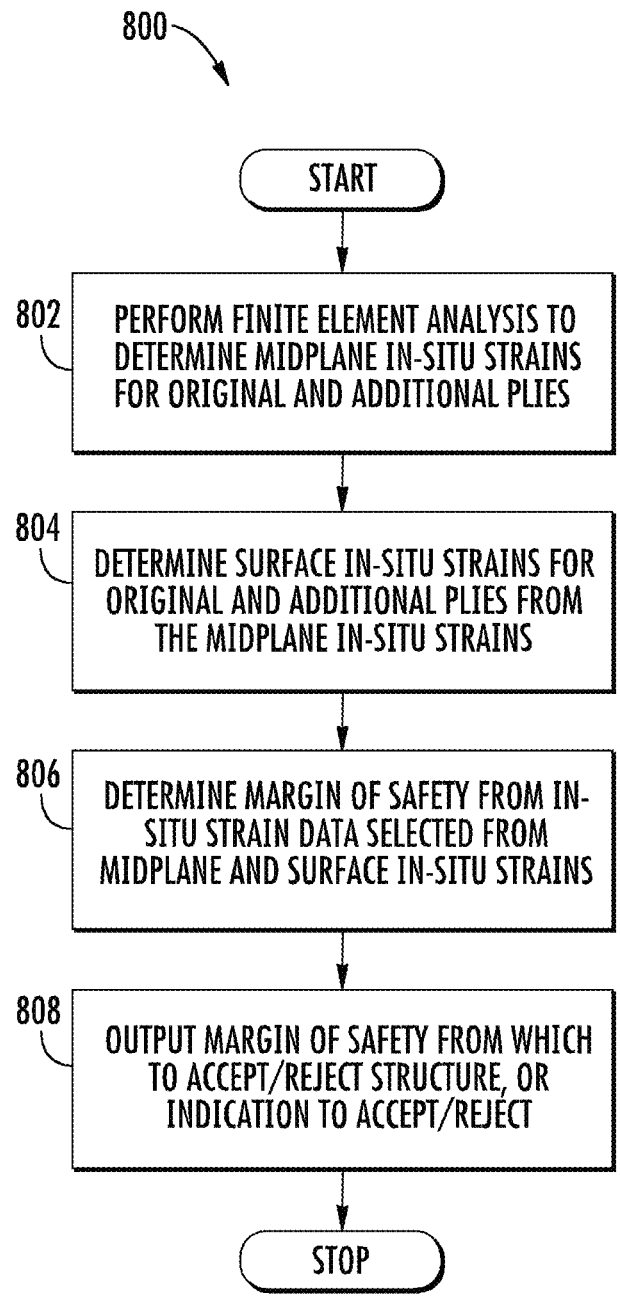
FIG. 8 is a flowchart illustrating various steps in a method of analyzing a repaired composite structure according to example implementations.

FIG. 8 is a flowchart illustrating various steps in a method 800 for analyzing a repaired composite structure 100 composed of a plurality of original plies 102 and additional repair plies 104 at an area of repair, each ply including a top surface, a midplane and a bottom surface. As shown at block 802, the method includes performing a finite element analysis of a finite element model of the repaired composite structure composed of a plurality of finite elements for the plurality of original plies and the additional repair plies, the finite element analysis being performed to determine in-situ strains at the midplanes of and thereby midplane in-situ strains at the plurality of original plies and the additional repair plies. As shown at block 804, the method includes determining in-situ strains at the top surface and the bottom surface of and thereby surface in-situ strains at the plurality of original plies and the additional repair plies from the midplane in-situ strains. The method includes determining a margin of safety for the repaired composite structure from in-situ strain data selected from the midplane in-situ strains and surface in-situ strains, as shown at block 806. And the method includes outputting the margin of safety from which to accept or reject the repaired composite structure, or an indication to accept or reject the repaired composite structure based on the margin of safety, as shown at block 808.

According to example implementations of the present disclosure, the repaired composite analysis system 200 and its subsystems including the PEA subsystem 202 and margin of safety analysis subsystem 204 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 9:
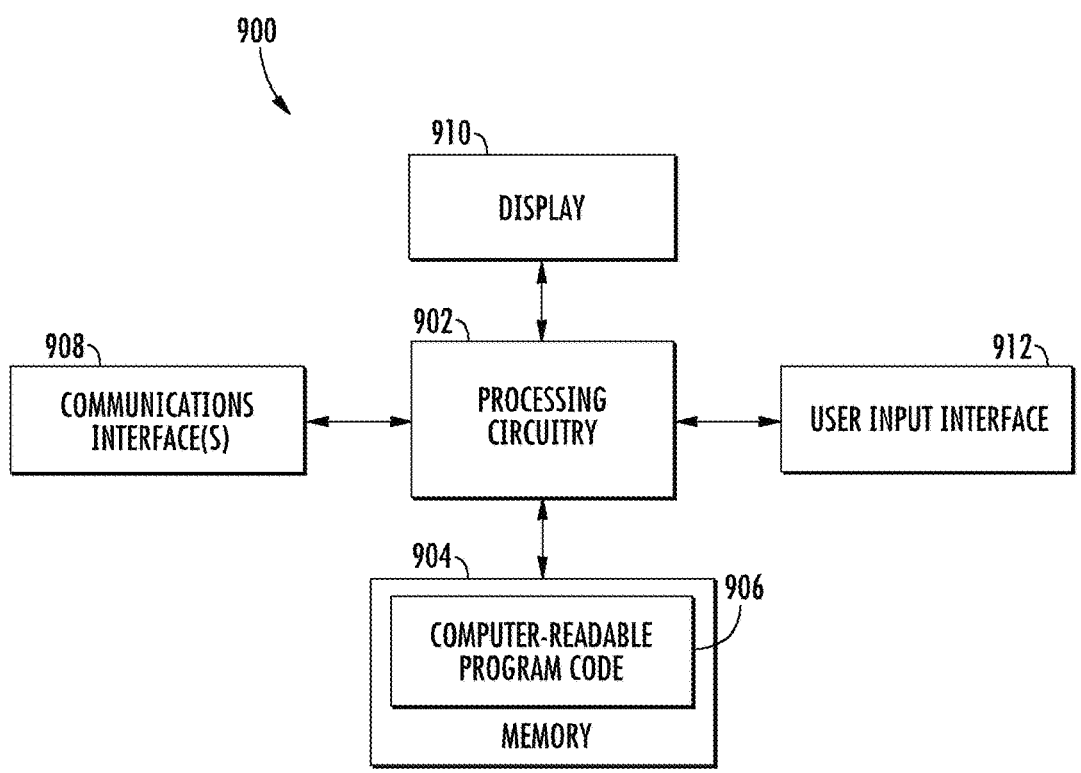
FIG. 9 illustrates an apparatus according to some example implementations of the present disclosure.

FIG. 9 illustrates an apparatus 900 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 902 (e.g., processor unit) connected to a memory 904 (e.g., storage device).

The processor 902 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 904 (of the same or another apparatus).

The processor 902 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 904, the processor 902 may also be connected to one or more interfaces for displaying, transmitting and/or receiving information. The interfaces may include a communications interface 908 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNW) or the like.

The user interfaces may include a display 910 and/or one or more user input interfaces 912 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by processor, or storage of instructions in a computer-readable storage medium, supports combinations of operations for performing the specified functions. In this manner, an apparatus 900 may include processor 902 and a computer-readable storage medium or memory 904 coupled to the processor, where the processor is configured to execute computer-readable program code 906 stored in the memory. It will also be understood that one or more functions, and combinations of functions, may be implemented by special purpose hardware-based computer systems and/or processor which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for analyzing a repaired composite structure composed of a plurality of original plies and additional repair plies at an area of repair, each ply including a top surface, a midplane and a bottom surface, the apparatus comprising a processor and a memory storing executable instructions that, in response to execution by the processor, cause the apparatus to at least:

perform a finite element analysis of a finite element model of the repaired composite structure composed of a plurality of finite elements for the plurality of original plies and the additional repair plies, the finite element analysis being performed to determine in-situ strains at the midplanes of and thereby midplane in-situ strains at the plurality of original plies and the additional repair plies;

determine in-situ strains at the top surface and the bottom surface of and thereby surface in-situ strains at the plurality of original plies and the additional repair plies from the midplane in-situ strains;

determine a margin of safety for the repaired composite structure from in-situ strain data selected from the midplane in-situ strains and surface in-situ strains; and output the margin of safety from which to accept or reject the repaired composite structure, or an indication to accept or reject the repaired composite structure based on the margin of safety.

2. The apparatus of claim 1, wherein the apparatus being caused to determine the surface in-situ strains includes being caused to interpolate or extrapolate the surface in-situ strains from the midplane in-situ strains.

3. The apparatus of claim 1, wherein the apparatus being caused to determine the margin of safety includes being caused to determine an in-plane margin of safety based on a ratio of an allowable in-plane strain and an average of the midplane in-situ strains, and a bending margin of safety based on a ratio of an allowable bending strain and a maximum of the surface in-situ strains.

4. The apparatus of claim 3, wherein the apparatus being caused to determine the margin of safety includes being caused to determine a minimum of the in-plane margin of safety and the bending margin of safety and thereby the margin of safety for the repaired composite structure.

5. The apparatus of claim 1, wherein the repaired composite structure is a repaired composite sandwich structure composed of two fiber-reinforced composite face sheets and a core, each of the two fiber-reinforced composite face sheets including a plurality of original plies, one of the two fiber-reinforced composite face sheets including the additional repair plies, and wherein the apparatus being caused to determine the margin of safety includes being caused to determine an in-plane margin of safety for each fiber-reinforced composite face sheet based on a ratio of an allowable in-plane strain and an average of the midplane in-situ strains in plies of the fiber-reinforced composite face sheet, including the original plies and the additional repair plies in the one of the two fiber-reinforced composite face sheets that includes the additional repair plies.

6. The apparatus of claim 5, wherein the apparatus being caused to determine the in-plane margin of safety includes being caused to determine in-plane margins of safety for combined loads and moments applied parallel, tangential and perpendicular to fibers in the two fiber-reinforced composite face sheets.

7. The apparatus of claim 1, wherein the repaired composite structure is a repaired composite sandwich structure composed of two fiber-reinforced composite face sheets and a core, and wherein the apparatus being caused to determine the margin of safety includes being caused to determine a bending margin of safety based on a ratio of an allowable bending strain and a maximum of the surface in-situ strains.

8. A method for analyzing a repaired composite structure composed of a plurality of original plies and additional repair plies at an area of repair, each ply including a top surface, a midplane and a bottom surface, the method comprising:

performing a finite element analysis of a finite element model of the repaired composite structure composed of a plurality of finite elements for the plurality of original plies and the additional repair plies, the finite element analysis being performed to determine in-situ strains at the midplanes of and thereby midplane in-situ strains at the plurality of original plies and the additional repair plies;

determining in-situ strains at the top surface and the bottom surface of and thereby surface in-situ strains at the plurality of original plies and the additional repair plies from the midplane in-situ strains;

determining a margin of safety for the repaired composite structure from in-situ strain data selected from the midplane in-situ strains and surface in-situ strains; and outputting the margin of safety from which to accept or reject the repaired composite structure, or an indication to accept or reject the repaired composite structure based on the margin of safety.

9. The method of claim 8, wherein determining the surface in-situ strains includes interpolating or extrapolating the surface in-situ strains from the midplane in-situ strains.

10. The method of claim 8, wherein determining the margin of safety includes determining an in-plane margin of safety based on a ratio of an allowable in-plane strain and an average of the midplane in-situ strains, and a bending margin of safety based on a ratio of an allowable bending strain and a maximum of the surface in-situ strains.

11. The method of claim 10, wherein determining the margin of safety includes determining a minimum of the in-plane margin of safety and the bending margin of safety and thereby the margin of safety for the repaired composite structure.

12. The method of claim 8, wherein the repaired composite structure is a repaired composite sandwich structure composed of two fiber-reinforced composite face sheets and a core, each of the two fiber-reinforced composite face sheets including a plurality of original plies, one of the two fiber-reinforced composite face sheets including the additional repair plies, and wherein determining the margin of safety includes determining an in-plane margin of safety for each fiber-reinforced composite face sheet based on a ratio of an allowable in-plane strain and an average of the midplane in-situ strains in plies of the fiber-reinforced composite face sheet, including the original plies and the additional repair plies in the one of the two fiber-reinforced composite face sheets that includes the additional repair plies.

13. The method of claim 12, wherein determining the in-plane margin of safety includes determining in-plane margins of safety for combined loads and moments applied parallel, tangential and perpendicular to fibers in the two fiber-reinforced composite face sheets.

14. The method of claim 8, wherein the repaired composite structure is a repaired composite sandwich structure composed of two fiber-reinforced composite face sheets and a core, and wherein determining the margin of safety includes determining a bending margin of safety based on a ratio of an allowable bending strain and a maximum of the surface in-situ strains.

15. A computer readable medium for analyzing a repaired composite structure composed of a plurality of original plies and additional repair plies at an area of repair, each ply including a top surface, a midplane and a bottom surface, the computer-readable storage medium being non-transitory and having computer-readable program code portions stored therein that, in response to execution by a processor, cause an apparatus to at least:

perform a finite element analysis of a finite element model of the repaired composite structure composed of a plurality of finite elements for the plurality of original plies and the additional repair plies, the finite element analysis being performed to determine in-situ strains at the midplanes of and thereby midplane in-situ strains at the plurality of original plies and the additional repair plies;

determine in-situ strains at the top surface and the bottom surface of and thereby surface in-situ strains at the plurality of original plies and the additional repair plies from the midplane in-situ strains;

determine a margin of safety for the repaired composite structure from in-situ strain data selected from the midplane in-situ strains and surface in-situ strains; and output the margin of safety from which to accept or reject the repaired composite structure, or an indication to accept or reject the repaired composite structure based on the margin of safety.

16. The computer readable medium of claim 15, wherein the apparatus being caused to determine the surface in-situ strains includes being caused to interpolate or extrapolate the surface in-situ strains from the midplane in-situ strains.

17. The computer readable medium of claim 15, wherein the apparatus being caused to determine the margin of safety includes being caused to determine an in-plane margin of safety based on a ratio of an allowable in-plane strain and an average of the midplane in-situ strains, and a bending margin of safety based on a ratio of an allowable bending strain and a maximum of the surface in-situ strains.

18. The computer readable medium of claim 17, wherein the apparatus being caused to determine the margin of safety includes being caused to determine a minimum of the in-plane margin of safety and the bending margin of safety and thereby the margin of safety for the repaired composite structure.

19. The computer readable medium of claim 15, wherein the repaired composite structure is a repaired composite sandwich structure composed of two fiber-reinforced composite face sheets and a core, each of the two fiber-reinforced composite face sheets including a plurality of original plies, one of the two fiber-reinforced composite face sheets including the additional repair plies, and wherein the apparatus being caused to determine the margin of safety includes being caused to determine an in-plane margin of safety for each fiber-reinforced composite face sheet based on a ratio of an allowable in-plane strain and an average of the midplane in-situ strains in plies of the fiber-reinforced composite face sheet, including the original plies and the additional repair plies in the one of the two fiber-reinforced composite face sheets that includes the additional repair plies.

20. The computer readable medium of claim 19, wherein the apparatus being caused to determine the in-plane margin of safety includes being caused to determine in-plane margins of safety for combined loads and moments applied parallel, tangential and perpendicular to fibers in the two fiber-reinforced composite face sheets.

21. The computer readable medium of claim 15, wherein the repaired composite structure is a repaired composite sandwich structure composed of two fiber-reinforced composite face sheets and a core, and wherein the apparatus being caused to determine the margin of safety includes being caused to determine a bending margin of safety based on a ratio of an allowable bending strain and a maximum of the surface in-situ strains.

* * * * *